(12) United States Patent
Chen et al.

(10) Patent No.: US 8,503,858 B2
(45) Date of Patent: Aug. 6, 2013

(54) MACHINE-IMPLEMENTED METHOD FOR ESTABLISHING A PLAYBACK INTERFACE, AND COMPUTER-READABLE RECORDING MEDIUM FOR IMPLEMENTING THE SAME

(75) Inventors: Chiou-Hung Chen, Kaohsiung (TW); Shu-Yuan Chang, Taipei (TW)

(73) Assignee: Corel Corporation, Ottawa (CA)

( * ) Notice: Subject to any disclaimer, the term of this patent is extended or adjusted under 35 U.S.C. 154(b) by 1113 days.

(21) Appl. No.: 12/013,189

(22) Filed: Jan. 11, 2008

(65) Prior Publication Data

US 2009/0052872 A1 Feb. 26, 2009

(30) Foreign Application Priority Data

Aug. 20, 2007 (TW) .............................. 96130723 A

(51) Int. Cl.
*H04N 9/80* (2006.01)
(52) U.S. Cl.
USPC ........................................................ 386/239
(58) Field of Classification Search
USPC .................... 715/704; 386/126, 239; 725/55
See application file for complete search history.

(56) References Cited

U.S. PATENT DOCUMENTS

| | | | | |
|---|---|---|---|---|
| 5,745,505 A | * | 4/1998 | Yonemitsu et al. | 714/755 |
| 2003/0180032 A1 | * | 9/2003 | Barde et al. | 386/55 |
| 2003/0237043 A1 | * | 12/2003 | Novak et al. | 715/500.1 |
| 2004/0078383 A1 | * | 4/2004 | Mercer et al. | 707/102 |
| 2004/0093360 A1 | * | 5/2004 | Hudson | 707/204 |
| 2004/0213552 A1 | * | 10/2004 | Kato | 386/69 |
| 2005/0117464 A1 | * | 6/2005 | Akita | 369/30.27 |
| 2005/0125082 A1 | * | 6/2005 | Hanson et al. | 700/19 |
| 2006/0265403 A1 | * | 11/2006 | Mercer et al. | 707/10 |
| 2007/0147781 A1 | * | 6/2007 | Shibata | 386/95 |
| 2007/0180466 A1 | * | 8/2007 | Ando et al. | 725/37 |
| 2007/0297761 A1 | * | 12/2007 | Shibutani | 386/95 |
| 2007/0297764 A1 | * | 12/2007 | Shibutani | 386/95 |
| 2008/0069523 A1 | * | 3/2008 | Hyodo et al. | 386/95 |

* cited by examiner

*Primary Examiner* — Michael S McNally
(74) *Attorney, Agent, or Firm* — Mark J. Danielson; Pillsbury Winthrop Shaw Pittman LLP

(57) ABSTRACT

A machine-implemented method for establishing a playback interface for a target disc when storing contents of a plurality of original discs into the target disc includes: (A) analyzing each of the original discs for relevant disc information, and recording the disc information of the original discs in a disc information list; (B) analyzing each sequence of each of the original discs for relevant sequence information, and recording the sequence information of the original discs in a playback sequence list; and (C) establishing a playback interface for the target disc according to the disc information list and the playback sequence list.

24 Claims, 7 Drawing Sheets

--- analyzing each of the original discs for relevant disc information, the disc information of the original discs being recorded in a disc information list —121 analyzing each sequence of each of the original discs for relevant sequence information, the sequence information of the original discs being recorded in a playback sequence list —122 analyzing each chapter of each sequence of each of the original discs for relevant chapter information, the chapter information of the original discs being recorded in a chapter information list —123

```
<TitleSet defaultLanguage="en" timeBase="60fps">

<Title id="New York Trip" onEnd="New York Trip" titleDuration="00:60:10:00"
titleNumber="1">
<PrimaryAudioVideoClip dataSource="Disc"
src="file:///dvddisc/HVDVD_TS/ClipP008.MAP"
titleTimeBegin="00:00:00:00" titleTimeEnd="00:60:10:00">
<Video track="1"/>
<Audio track="1"/>
</PrimaryAudioVideoClip>

<ChapterList>
<Chapter titleTimeBegin="00:00:00:00"/>
        <Chapter titleTimeBegin="00:10:00:00"/>
        <Chapter titleTimeBegin="00:30:00:00"/>
        <Chapter titleTimeBegin="00:40:00:00"/>
</ChapterList>
</Title>

<Title id="Paris Trip" onEnd="Paris Trip" titleDuration="00:00:20:00"
titleNumber="2">
<PrimaryAudioVideoClip dataSource="Disc"
src="file:///dvddisc/HVDVD_TS/ClipP000.MAP"
titleTimeBegin="00:00:00:00" titleTimeEnd="00:00:20:00">
<Video track="1"/>
</PrimaryAudioVideoClip>

<ChapterList>
    <Chapter titleTimeBegin="00:00:00:00"/>
</ChapterList>
</Title>
```

FIG. 6

MACHINE-IMPLEMENTED METHOD FOR ESTABLISHING A PLAYBACK INTERFACE, AND COMPUTER-READABLE RECORDING MEDIUM FOR IMPLEMENTING THE SAME

CROSS-REFERENCE TO RELATED APPLICATION

This application claims priority of Taiwanese Application No. 096130723, filed on Aug. 20, 2007.

BACKGROUND OF THE INVENTION

1. Field of the Invention

The invention relates to a method and a computer-readable recording medium for establishing a playback interface for a disc, more particularly to a machine-implemented method and a computer-readable recording medium for establishing a playback interface for a target disc when storing contents of a plurality of original discs into the target disc.

2. Description of the Related Art

With the developments of single-sided double-layer (SS-DL), double-sided double-layer (DS-DL) and BluRay disc recording techniques, storage capacities of discs have increased dramatically. At present, there are two newly-developed standards for digital versatile discs (DVD), namely High Definition DVD (HD-DVD) and BluRay DVD (BD). As compared to a conventional DVD disc with a storage capacity of 4.7G, the High Definition DVD has a storage capacity of 30G, whereas the BluRay DVD has a storage capacity of 50G. Therefore, when it is demanded to store contents of a plurality of small-capacity discs into one large-capacity target disc, an approach to establishing a playback interface for the target disc is of main concern.

SUMMARY OF THE INVENTION

Therefore, the object of the present invention is to provide a method and a computer-readable recording medium for establishing a playback interface for a large-capacity target disc when storing contents of a plurality of original discs into the target disc.

According to one aspect of the present invention, there is provided a machine-implemented method for establishing a playback interface for a target disc when storing contents of a plurality of original discs into the target disc. The machine-implemented method includes:

(A) analyzing each of the original discs for relevant disc information, and recording the disc information of the original discs in a disc information list;

(B) analyzing each sequence of each of the original discs for relevant sequence information, and recording the sequence information of the original discs in a playback sequence list; and (C) establishing a playback interface for the target disc according to the disc information list and the playback sequence list.

According to another aspect of the present invention, there is provided a computer-readable recording medium that includes program instructions for causing a computing apparatus to execute consecutive steps of the machine-implemented method.

BRIEF DESCRIPTION OF THE DRAWINGS

Other features and advantages of the present invention will become apparent in the following detailed description of the preferred embodiments with reference to the accompanying drawings, of which:

FIG. 6 illustrates an exemplary script according to the first preferred embodiment;

DETAILED DESCRIPTION OF THE PREFERRED EMBODIMENTS

Figure 1:
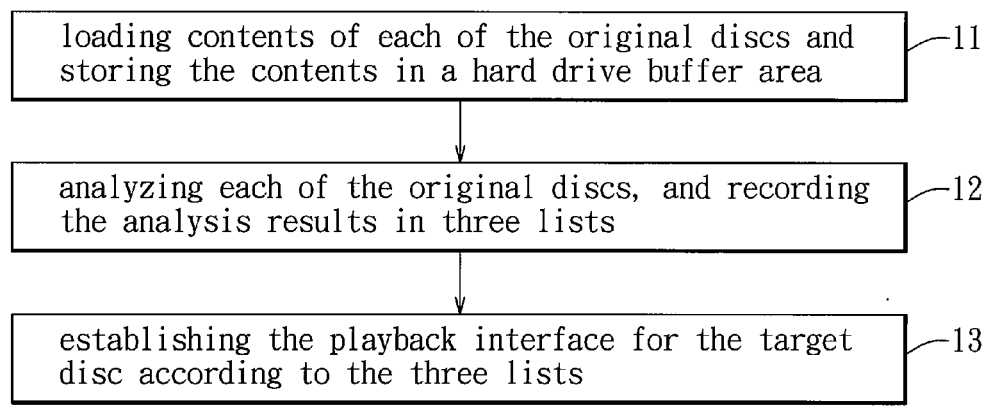
FIG. 1 is a flow chart, illustrating the first preferred embodiment of a machine-implemented method for establishing a playback interface for a target disc when storing contents of a plurality of original discs into the target disc according to the present invention.

Before the present invention is described in greater detail, it should be noted that like elements are denoted by the same reference numerals throughout the disclosure.

Illustrated in FIG. 1 is the first preferred embodiment of a machine-implemented method for establishing a playback interface for a target disc when storing contents of a plurality of original discs into the target disc according to the present invention. There is no limitation on the formats of the original discs, i.e., the original discs can include a Video Compact Disc (VCD), a Super VCD, a Digital Versatile Disc (DVD), a High Definition DVD (HD-DVD), and a BluRay DVD (BD), etc. The target disc can be one of a High Definition DVD and a BluRay DVD. It should be noted herein that High Definition DVD can be categorized into two types, i.e., the menu-based HD DVD-video and the script-based iHD. BluRay DVD can also be categorized into two types, i.e, the menu-based BluRay DVD movie, and the script-based BluRay DVD Java (BD-J).

As shown in FIG. 1, the machine-implemented method according to the first preferred embodiment includes the followings steps:

In step 11, contents of each of the original discs are loaded and stored in a hard drive buffer area.

In step 12, each of the original discs (i.e., the contents stored in the hard drive buffer area) is analyzed, and the analysis results are recorded in three lists.

Finally, in step 13, the playback interface for the target disc is established according to these three lists.

Figure 2:
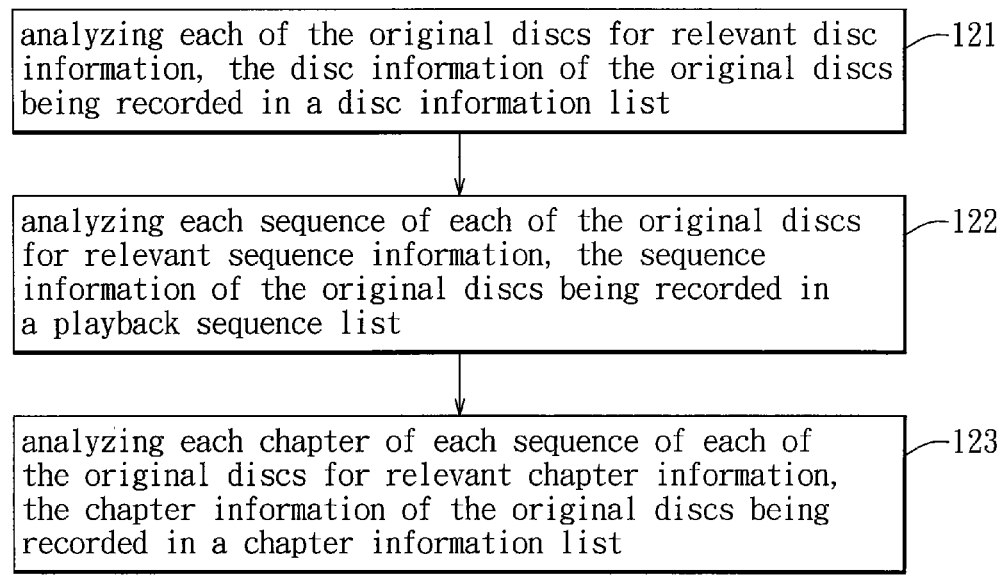
FIG. 2 is a flow chart, illustrating sub-steps of step 12 according to the first preferred embodiment.

With further reference to FIG. 2, step 12 includes the following sub-steps:

In step 121, each of the original discs is analyzed for relevant disc information, and the disc information of the original discs is recorded in a disc information list, which is a first one of the aforementioned three lists. The disc information of each of the original discs may include a disc title, a file name of each data file included in the original disc, a disc playback duration of the original disc, etc.

Shown in the following Table 1 is an exemplary disc information list.

TABLE 1

Disc Information List

| Original Disc | Disc Title | File Name of Data Files Stored in Hard Drive Buffer Area | Disc Playback Duration |
|---|---|---|---|
| Disc 1 | New York Trip | disc01.001, disc01.002, disc01.003 | 120 minutes |
| Disc 2 | Paris Trip | disc02.001, disc02.002 | 100 minutes |

In step 122, each sequence of each of the original discs is analyzed for relevant sequence information, and the sequence information of the original discs is recorded in a playback sequence list, which is a second one of the aforementioned three lists. The sequence information of each sequence of each of the original discs may include a sequence number of the sequence, a chapter number of each chapter included in the sequence, etc.

Shown in the following Table 2 is an exemplary playback sequence list, where "S1-3" denotes a $3^{rd}$ sequence in the $1^{st}$ original disc, i.e., Disc 1, and "S2-1" denotes a $1^{st}$ sequence in the $2^{nd}$ original disc, i.e., Disc 2. In addition, "ch1-3-2" denotes a $2^{nd}$ chapter in the $3^{rd}$ sequence of the $1^{st}$ original disc. The rest may be deducted by analogy.

TABLE 2

Playback Sequence List

| Sequence No. | Chapter No. of Each Chapter Included in the Sequence |
|---|---|
| S1-1 | ch1-1-1, ch1-1-2, ch1-1-3 |
| S1-2 | ch1-2-1, ch1-2-2 |
| S1-3 | ch1-3-1, ch1-3-2 |
| S2-1 | ch2-1-1, ch2-1-2 |
| S2-2 | ch2-2-1, ch2-2-2 |

In step 123, each chapter of each sequence of each of the original discs is analyzed for relevant chapter information, and the chapter information of the original discs is recorded in a chapter information list, which is a third one of the aforementioned three lists. The chapter information of each chapter of each sequence of each of the original discs may include a file name of each corresponding data file, a start time, an end time, a chapter playback duration, etc. An exemplary chapter information list is shown in Table 3 below.

TABLE 3

Chapter Information List

| Chapter No. | Data File Name | Start Time | End Time | Chapter Playback Duration |
|---|---|---|---|---|
| ch1-1-1 | disc01.001 | 00:10:00 | 00:30:00 | 20 minutes |
| ch1-1-2 | disc01.001 | 00:30:00 | 01:10:00 | 40 minutes |
| ch1-1-3 | disc01.002 | 00:00:00 | 00:00:10 | 10 seconds |
| ... | ... | ... | ... | ... |
| ch2-2-2 | disc02.001 | 00:00:00 | 00:00:20 | 20 seconds |

In this embodiment, the playback interface for the target disc is established according to the disc information list, the playback sequence list, and the chapter information list in step 13.

Figure 3:
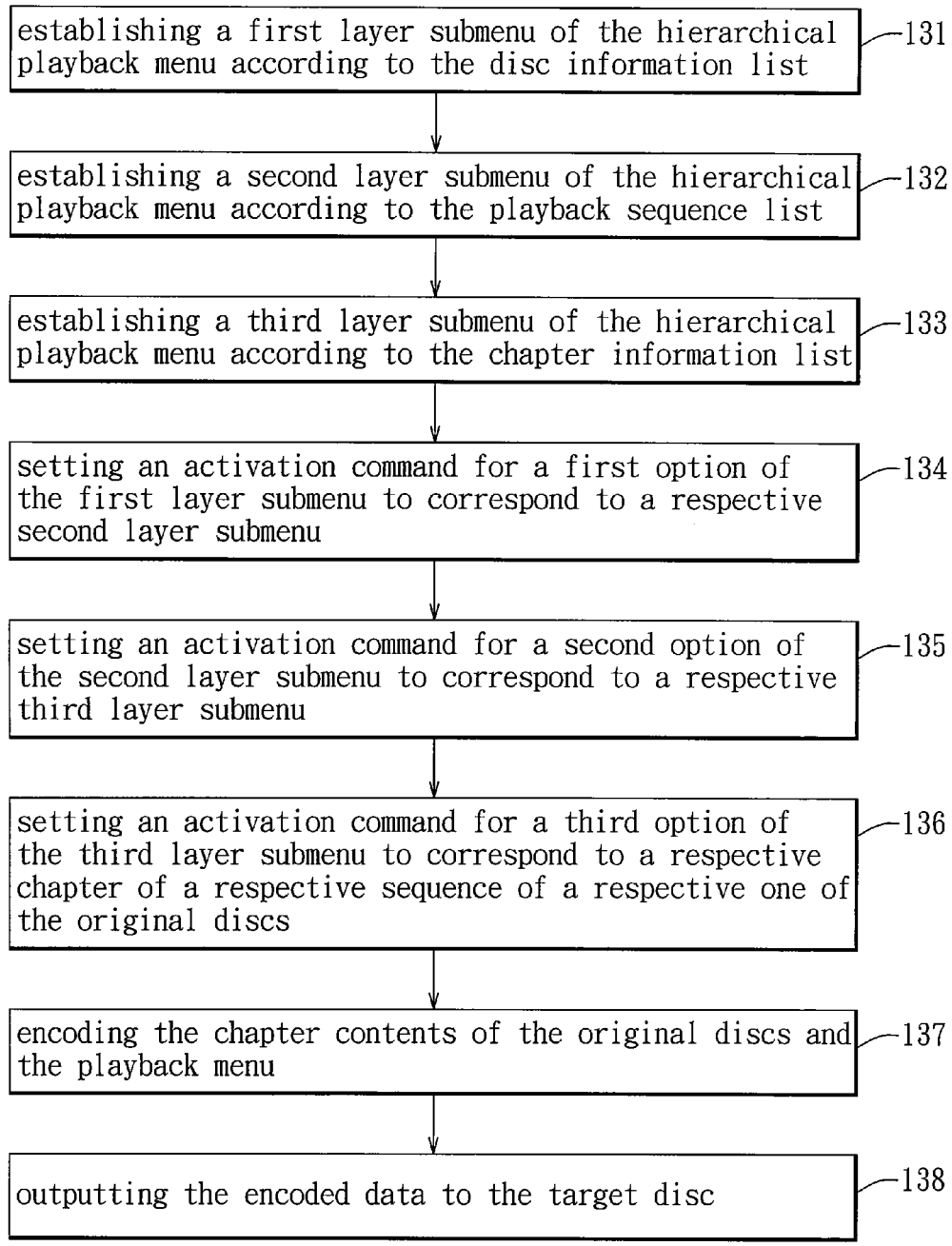
FIG. 3 is a flow chart, illustrating sub-steps of step 13 according to the first preferred embodiment when the target disc is a menu-based target disc.
Figure 4:
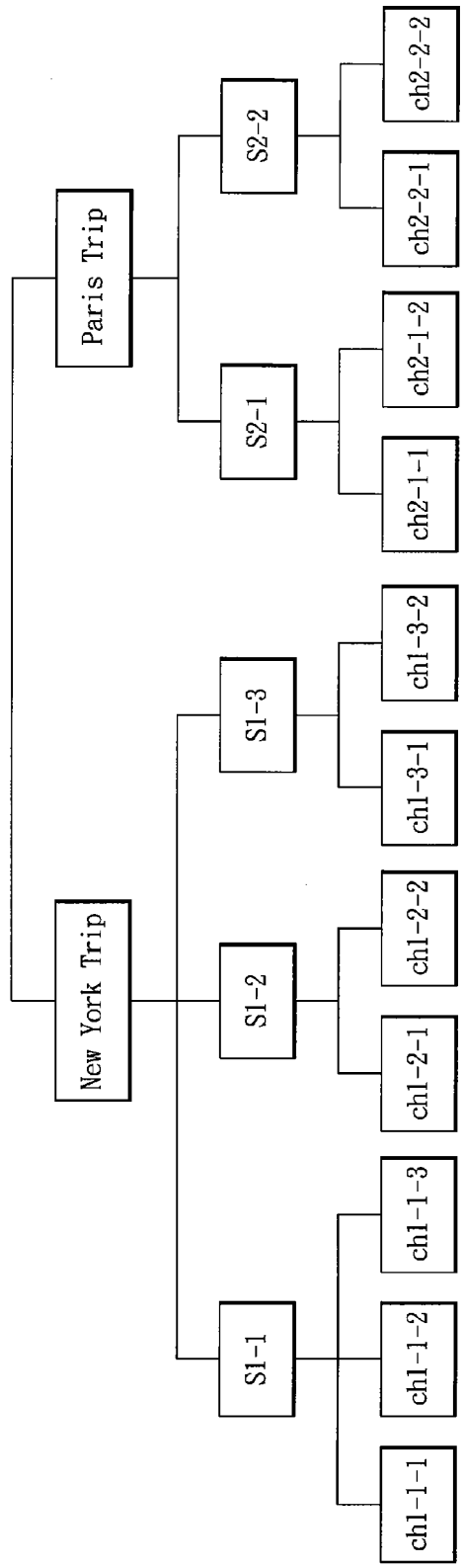
FIG. 4 is a schematic diagram, illustrating an exemplary three-layered hierarchical playback menu according to the first preferred embodiment.

With reference to FIG. 3, when the target disc is a menu-based target disc, such as a HD DVD-Video or a BluRay DVD movie, the playback interface includes a hierarchical playback menu. In this embodiment, the hierarchical playback menu is three-layered, and step 13 includes the following sub-steps:

In step 131, it is first determined whether combined size of the contents of the original discs exceeds storage capacity of the target disc with reference to the disc playback durations of the original discs recorded in the disc information list. When the result reveals that the combined size of the contents of the original discs is within the storage capacity of the target disc, a first layer submenu of the hierarchical playback menu is established according to the disc information list. In this embodiment, the first layer submenu includes first options that are respectively named after the disc titles, but is not limited thereto in other embodiments of the present invention. In the exemplary hierarchical playback menu shown in FIG. 4, the first layer submenu includes two options that are respectively named "New York Trip" and "Paris Trip".

In step 132, a second layer submenu of the hierarchical playback menu is established according to the playback sequence list. In this embodiment, the second layer submenu includes second options that are respectively named after sequence numbers of the sequences of the original discs, but is not limited thereto in other embodiments of the present invention. In the example shown in FIG. 4, the hierarchical playback menu includes two of the second layer submenus. The first one of the second layer submenus includes three options, namely "S1-1", "S1-2" and "S1-3", while the second one of the second layer submenus includes two options, namely "S2-1" and "S2-2".

In step 133, a third layer submenu of the hierarchical playback menu is established according to the chapter information list. In this embodiment, the third layer submenu includes third options that are respectively named after chapter numbers of chapters included in the sequences of the original discs, but is not limited thereto in other embodiments of the present invention. In the example shown in FIG. 4, the hierarchical playback menu includes five of the third layer submenus. A first one of the third layer submenus includes three options, namely "ch1-1-1", "ch1-1-2" and "ch1-1-3", a second one of the third layer submenus includes two options, namely "ch1-2-1" and "ch1-2-2", a third one of the third layer submenus includes two options, namely "ch1-3-1" and "ch1-3-2", a fourth one of the third layer submenus includes two options, namely "ch2-1-1" and "ch2-1-2", while a fifth one of the third layer submenus includes two options, namely "ch2-2-1" and "ch2-2-2".

In step 134, an activation command is set for a first option of the first layer submenu to correspond to a respective second layer submenu. In this embodiment, an activation command is set for each of the first options of the first layer submenu to correspond to a respective one of the second layer submenus. In the exemplary hierarchical playback menu shown in FIG. 4, an activation command is set for the first option named "New York Trip" to correspond to the first one of the second layer submenus, and an activation command is set for the first option named "Paris Trip" to correspond to the second one of the second layer submenus.

In step 135, an activation command is set for a second option of the second layer submenu to correspond to a respective third layer submenu. In this embodiment, an activation command is set for each second option of each of the second layer submenus to correspond to a respective one of the third layer submenus. In the exemplary hierarchical playback menu shown in FIG. 4, activation commands are respectively set for the second options of the first one of the second layer submenus to correspond to the first to third ones of the third layer submenus, while activation commands are respectively set for the second options of the second one of the second layer submenus to correspond to the fourth and fifth ones of the third layer submenus.

In step 136, an activation command is set for a third option of the third layer submenu to correspond to a respective chapter of a respective sequence of a respective one of the original discs. In this embodiment, an activation command is set for each of the third options of each of the third layer submenus to correspond to a respective chapter of a respective one of the sequences of a respective one of the original discs. In the exemplary hierarchical playback menu shown in FIG. 4, activation commands are respectively set for the third options of the first one of the third layer submenus to correspond to the $1^{st}$, $2^{nd}$ and $3^{rd}$ chapters of the $1^{st}$ sequence of the $1^{st}$ original disc. Activation commands are respectively set for the third options of the second one of the third layer submenus to correspond to the $1^{st}$ and $2^{nd}$ chapters of the $2^{nd}$ sequence of the $1^{st}$ original disc. Activation commands are respectively set for the third options of the third one of the third layer submenus to correspond to the $1^{st}$ and $2^{nd}$ chapters of the $3^{rd}$ sequence of the $1^{st}$ original disc. Activation commands are respectively set for the third options of the fourth one of the third layer submenus to correspond to the $1^{st}$ and $2^{nd}$ chapters of the $1^{st}$ sequence of the $2^{nd}$ original disc. Activation commands are respectively set for the third options of the fifth one of the third layer submenus to correspond to the $1^{st}$ and $2^{nd}$ chapters of the $2^{nd}$ sequence of the $2^{nd}$ original disc.

In step 137, the chapter contents of the original discs and the playback menu are encoded.

In step 138, the encoded data is outputted to the target disc.

Figure 5:
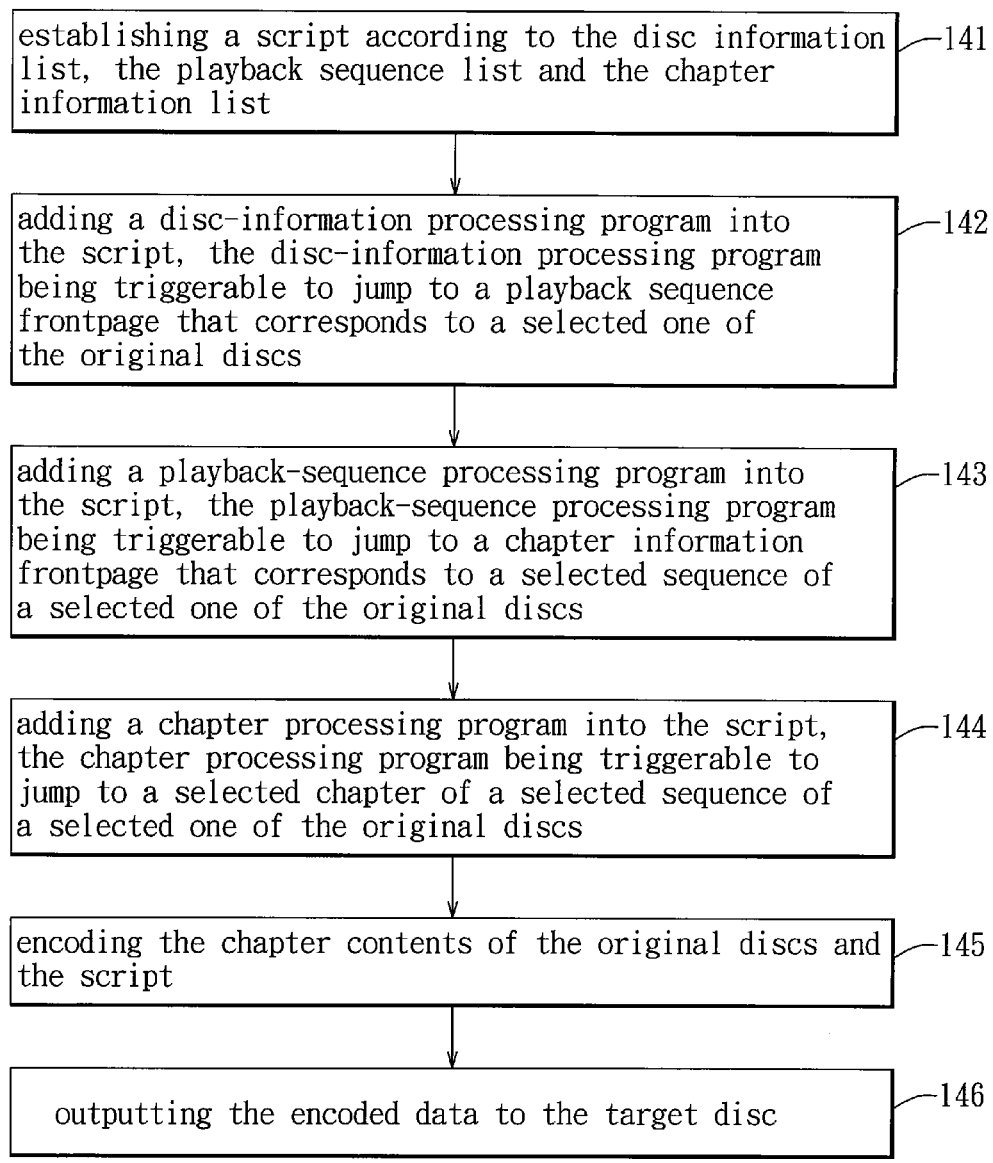
FIG. 5 is a flow chart, illustrating sub-steps of step 13 according to the first preferred embodiment when the target disc is a script-based target disc.

With reference to FIG. 5, when the target disc is a script-based target disc, such as an iHD or a BluRay DVD Java, the playback interface includes a script-structure playback interface, and step 13 includes the following sub-steps:

In step 141, a script is established according to the disc information list, the playback sequence list and the chapter information list. An exemplary script is illustrated in FIG. 6.

In step 142, a disc-information processing program is added into the script. The disc-information processing program is triggerable to jump to a playback sequence frontpage that corresponds to a selected one of the original discs (e.g., "New York Trip" and "Paris Trip"). The playback sequence frontpage may include sequence options, such as S1-1, S1-2 and S1-3 for "New York Trip", and S2-1 and S2-2 for "Paris Trip".

In step 143, a playback-sequence processing program is added into the script. The playback-sequence processing program is triggerable to jump to a chapter information frontpage that corresponds to a selected sequence (e.g., S1-1, S1-2, S1-3, S2-1 and S2-2) of a selected one of the original discs. The chapter information frontpage may include chapter options, such as ch1-1-1, ch1-1-2 and ch1-1-3 for the sequence "S1-1", ch1-2-1 and ch1-2-2 for the sequence "S1-2", etc.

In step 144, a chapter processing program is added into the script. The chapter processing program is trigger able to jump to a selected chapter (e.g., ch1-1-1, ch1-1-2, ch1-1-3, ch1-2-1, etc.) of a selected sequence of a selected one of the original discs.

In step 145, the chapter contents of the original discs and the script are encoded.

In step 146, the encoded data is outputted to the target disc.

With reference to FIG. 2, the second preferred embodiment differs from the first preferred embodiment in that sub-step 123 is omitted, i.e., there is no chapter information list. In other words, the analysis results are stored in the disc information list and the playback sequence list only. Therefore, in step 13 (refer to FIG. 1), the playback interface for the target disc is established according to the disc information list and the playback sequence list.

Figure 7:
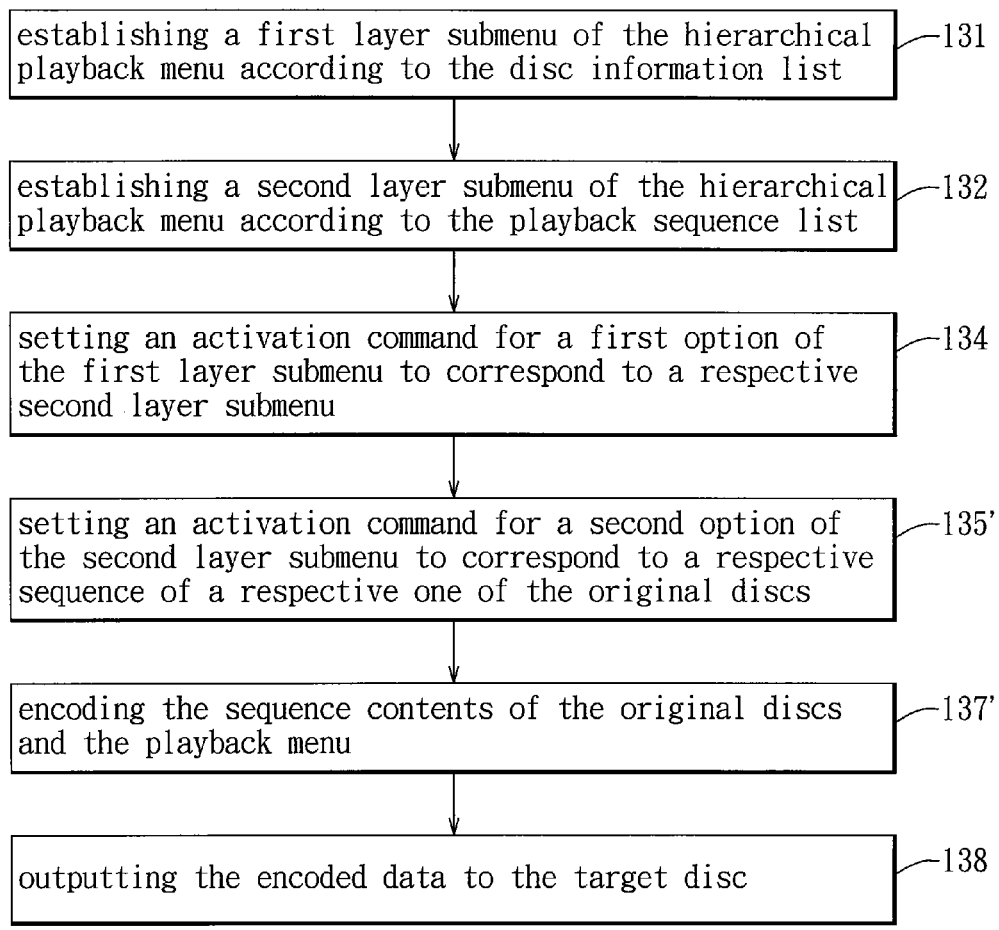
FIG. 7 is a flow chart, illustrating sub-steps of step 13 according to the second preferred embodiment of this invention when the target disc is a menu-based target disc.

Consequently, when the target disc is menu-based, the hierarchical playback menu is two-layered. In particular, with reference to FIG. 7, sub-steps 133 and 136 of the first preferred embodiment (refer to FIG. 3) are omitted in the second preferred embodiment. Further, in sub-step 135' of the second preferred embodiment, instead of setting an activation command for a second option of the second layer submenu to correspond to a respective third layer submenu, an activation command is set for a second option of the second layer submenu to correspond to a respective sequence of a respective one of the original discs. In addition, in sub-step 137' of the second preferred embodiment, the sequence contents, instead of the chapter contents, of the original discs are encoded along with the playback menu.

Figure 8:
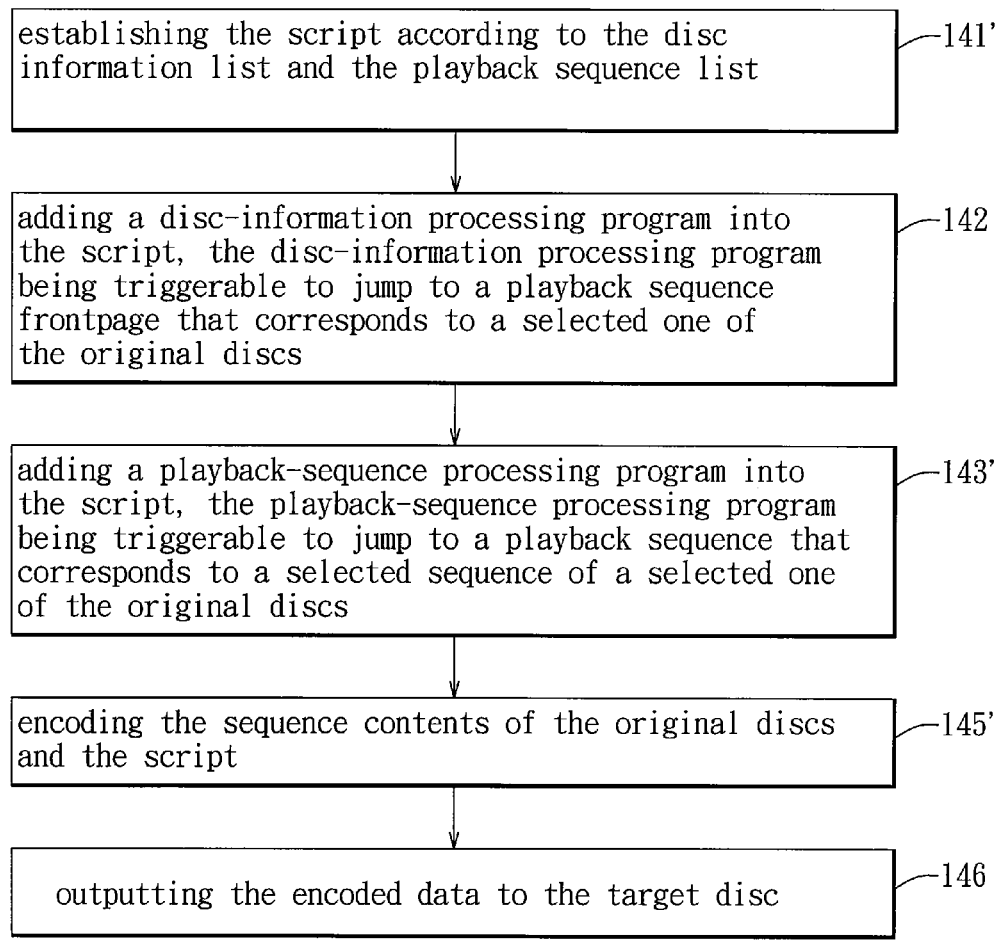
FIG. 8 is a flow chart, illustrating sub-steps of step 13 according to the second preferred embodiment when the target disc is a script-based target disc.

On the other hand, with reference to FIG. 8, when the target disc is script-based, the script is established according to the disc information list and the playback sequence list in sub-step 141' of the second preferred embodiment. In sub-step 143' of the second preferred embodiment, the playback-sequence processing program is triggerable to jump to a playback sequence that corresponds to a selected sequence of a selected one of the original discs. Further, sub-step 144 of the first preferred embodiment is omitted in the second preferred embodiment. Moreover, in sub-step 145' of the second preferred embodiment, the sequence contents of the original discs are encoded along with the script.

The computer-readable recording medium according to the present invention includes program instructions for causing a computing apparatus to execute consecutive steps of the machine-implemented method for establishing a playback interface for a target disc when storing contents of a plurality of original discs into the target disc. The machine-implemented method may be one of the first and second preferred embodiments.

In sum, the present invention provides a machine-implemented method for establishing a playback interface for a large-capacity target disc when it is demanded to store contents of a plurality of small-capacity discs into the large-capacity target disc.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A machine-implemented method for establishing a playback interface for a target disc when storing contents of a plurality of original discs into the target disc, the machine-implemented method comprising:
    (A) analyzing the contents of each of the original discs for relevant disc information, and recording the disc information extracted from the contents of the original discs in a disc infoilliation list;
    (B) analyzing the contents of each of the original discs for relevant information regarding how a sequence of content is arranged in the original disc, dynamically generating sequence information based on the analysis, and recording the sequence information dynamically generated based on the analysis of the contents of the original discs in a newly created playback sequence list for the target disc, wherein recording the dynamically generated sequence information includes preserving the sequence of content in the original discs, such that when playing back content from the target disc stored from the original discs, the dynamically generated sequence information from the original discs is used; and (C) establishing a playback interface for the target disc according to the disc information list and the playback sequence list, the playback interface providing an interactive user interface for allowing a user to selectively playback contents of the target disc stored from the plurality of original discs, wherein the playback interface is a script-structure playback interface, and wherein step (C) includes:

establishing a script according to the disc information list and the playback sequence list;

adding a disc-information processing program into the script, the disc-information processing program being triggerable to jump to a playback sequence frontpage that corresponds to a selected one of the original discs; and adding a playback-sequence processing program into the script, the playback-sequence processing program being triggerable to jump to a playback sequence that corresponds to a selected sequence of a selected one of the original discs.

2. The machine-implemented method for establishing a playback interface as claimed in claim 1, wherein the playback interface includes a hierarchical playback menu.

3. The machine-implemented method for establishing a playback interface as claimed in claim 2, wherein step (C) includes establishing a first layer submenu of the hierarchical playback menu according to the disc information list, and establishing a second layer submenu of the hierarchical playback menu according to the playback sequence list.

4. The machine-implemented method for establishing a playback interface as claimed in claim 3, wherein step (C) further includes setting an activation command for a first option of the first layer submenu to correspond to a respective second layer submenu, and setting an activation command for a second option of the second layer submenu to correspond to a respective sequence of a respective one of the original discs.

5. The machine-implemented method for establishing a playback interface as claimed in claim 1, further comprising, prior to step (C), analyzing each chapter of each sequence of each of the original discs for relevant chapter information, and recording the chapter information of the original discs in a chapter information list; wherein, in step (C), the playback interface for the target disc is established according to the disc information list, the playback sequence list and the chapter information list.

6. The machine-implemented method for establishing a playback interface as claimed in claim 5, wherein the playback interface includes a hierarchical playback menu.

7. The machine-implemented method for establishing a playback interface as claimed in claim 6, wherein step (C) includes:

establishing a first layer submenu of the hierarchical playback menu according to the disc information list;

establishing a second layer submenu of the hierarchical playback menu according to the playback sequence list; and establishing a third layer submenu of the hierarchical playback menu according to the chapter information list.

8. The machine-implemented method for establishing a playback interface as claimed in claim 7, wherein step (C) further includes setting an activation command for a first option of the first layer submenu to correspond to a respective second layer submenu, setting an activation command for a second option of the second layer submenu to correspond to a respective third layer submenu, and setting an activation command for a third option of the third layer submenu to correspond to a respective chapter of a respective sequence of a respective one of the original discs.

9. The machine-implemented method for establishing a playback interface as claimed in claim 5, wherein step (C) further includes:

adding a chapter processing program into the script, the chapter processing program being triggerable to jump to a selected chapter of a selected sequence of a selected one of the original discs.

10. The machine-implemented method for establishing a playback interface as claimed in claim 1, wherein the disc information of each of the original discs includes a disc title, a file name of each data file included in the original disc, and a disc playback duration of the original disc.

11. The machine-implemented method for establishing a playback interface as claimed in claim 1, wherein the sequence information of each sequence of each of the original discs includes a sequence number of the sequence and a chapter number of each chapter included in the sequence.

12. The machine-implemented method for establishing a playback interface as claimed in claim 5, wherein the chapter information of each chapter of each sequence of each of the original discs includes a file name of each corresponding data file, a start time, an end time, and a chapter playback duration.

13. A non-transitory computer-readable recording medium comprising program instructions for causing a computing apparatus to execute consecutive steps of a machine-implemented for establishing a playback interface for a target disc when storing contents of a plurality of original discs into the target disc, said machine-implemented method comprising:

(A) analyzing the contents of each of the original discs for relevant disc information, and recording the disc information extracted from the contents of the original discs in a disc information list;

(B) analyzing the contents of each of the original discs for relevant information regarding how a sequence of content is arranged in the original disc, dynamically generating sequence information based on the analysis, and recording the dynamically generated sequence information based on the analysis of the contents of the original discs in a newly created playback sequence list for the target disc, wherein recording the dynamically generated sequence information includes preserving the sequence of content as defined in the original discs, such that when playing back content from the target disc stored from the original discs, the dynamically generated sequence information from the original discs is used; and (C) establishing a playback interface for the target disc according to the disc information list and the playback sequence list, the playback interface providing an interactive user interface for allowing a user to selectively playback contents of the target disc stored from the plurality of original discs, wherein the playback interface is a script-structure playback interface, and wherein step (C) includes:

establishing a script according to the disc information list and the playback sequence list;

adding a disc-information processing program into the script, the disc-information processing program being triggerable to jump to a playback sequence frontpage that corresponds to a selected one of the original discs; and adding a playback-sequence processing program into the script, the playback-sequence processing program being triggerable to jump to a playback sequence that corresponds to a selected sequence of a selected one of the original discs.

14. The non-transitory computer-readable recording medium as claimed in claim 13, wherein the playback interface includes a hierarchical playback menu.

15. The non-transitory computer-readable recording medium as claimed in claim 14, where in step (C) of said machine-implemented method includes establishing a first layer submenu of the hierarchical playback menu according to the disc information list, and establishing a second layer submenu of the hierarchical playback menu according to the playback sequence list.

16. The non-transitory computer-readable recording medium as claimed in claim 15, wherein step (C) of said machine-implemented method further includes setting an activation command for a first option of the first layer submenu to correspond to a respective second layer submenu, and setting an activation command for a second option of the second layer submenu to correspond to a respective sequence of a respective one of the original discs.

17. The non-transitory computer-readable recording medium as claimed in claim 13, wherein said machine-implemented method further comprises, prior to step (C), analyzing each chapter of each sequence of each of the original discs for relevant chapter information, and recording the chapter information of the original discs in a chapter information list; and wherein, in step (C) of said machine-implemented method, the playback interface for the target disc is established according to the disc information list, the play back sequence list and the chapter information list.

18. The non-transitory computer-readable recording medium as claimed in claim 17, wherein the playback interface includes a hierarchical playback menu.

19. The non-transitory computer-readable recording medium as claimed in claim 18, wherein step (C) of said machine-implemented method includes:

establishing a first layer submenu of the hierarchical playback menu according to the disc information list;

establishing a second layer submenu of the hierarchical playback menu according to the playback sequence list; and establishing a third layer submenu of the hierarchical playback menu according to the chapter information list.

20. The non-transitory computer-readable recording medium as claimed in claim 19, wherein step (C) of said machine-implemented method further includes setting an activation command for a first option of the first layer submenu to correspond to a respective second layer submenu, setting an activation command for a second option of the second layer submenu to correspond to a respective third layer submenu, and setting an activation command for a third option of the third layer submenu to correspond to a respective chapter of a respective sequence of a respective one of the original discs.

21. The non-transitory computer-readable recording medium as claimed in claim 17, wherein step (C) of said machine-implemented method further includes:

adding a chapter processing program into the script, the chapter processing program being triggerable to jump to a selected chapter of a selected sequence of a selected one of the original discs.

22. The non-transitory computer-readable recording medium as claimed in claim 17, wherein the chapter information of each chapter of each sequence of each of the original discs includes a file name of each corresponding data file, a start time, an end time, and a chapter playback duration.

23. The non-transitory computer-readable recording medium as claimed in claim 13, wherein the disc information of each of the original discs includes a disc title, a file name of each data file included in the original disc, and a disc playback duration of the original disc.

24. The non-transitory computer-readable recording medium as claimed in claim 13, wherein the sequence information of each sequence of each of the original discs includes a sequence number of the sequence and a chapter number of each chapter included in the sequence.

* * * * *

UNITED STATES PATENT AND TRADEMARK OFFICE
CERTIFICATE OF CORRECTION

| | | |
|---|---|---|
| PATENT NO. | : 8,503,858 B2 | Page 1 of 1 |
| APPLICATION NO. | : 12/013189 | |
| DATED | : August 6, 2013 | |
| INVENTOR(S) | : Chen et al. | |

It is certified that error appears in the above-identified patent and that said Letters Patent is hereby corrected as shown below:

In the Claims

In Column 6, Line 59, in Claim 1, delete "infoilliation" and insert -- information --, therefor.

Signed and Sealed this
First Day of October, 2013

Teresa Stanek Rea
*Deputy Director of the United States Patent and Trademark Office*